United States Patent
Ben-Al-Lal et al.

(10) Patent No.: US 10,615,741 B2
(45) Date of Patent: Apr. 7, 2020

(54) METHOD AND APPARATUS FOR DETECTING, REGENERATING AND/OR PREVENTING DEFECTS IN A SOLAR PANEL INSTALLATION

(71) Applicant: FUTECH, Tessenderlo (BE)

(72) Inventors: Ismael Ben-Al-Lal, Zoutleeuw (BE); Pieter Vangeel, Ham (BE)

(73) Assignee: FUTECH, Tessenderlo (BE)

( * ) Notice: Subject to any disclaimer, the term of this patent is extended or adjusted under 35 U.S.C. 154(b) by 405 days.

(21) Appl. No.: 14/893,672

(22) PCT Filed: Jan. 21, 2014

(86) PCT No.: PCT/IB2014/058444
§ 371 (c)(1),
(2) Date: Nov. 24, 2015

(87) PCT Pub. No.: WO2014/191846
PCT Pub. Date: Dec. 4, 2014

(65) Prior Publication Data
US 2016/0134232 A1    May 12, 2016

(30) Foreign Application Priority Data
May 27, 2013   (BE) .................................. 2013/0369

(51) Int. Cl.
*H02S 40/34*    (2014.01)
*H02S 50/10*    (2014.01)

(52) U.S. Cl.
CPC ............. *H02S 40/34* (2014.12); *H02S 50/10* (2014.12)

(58) Field of Classification Search
CPC .................................. H02S 50/10; H02S 40/34
See application file for complete search history.

(56) References Cited

U.S. PATENT DOCUMENTS

| | | | |
|---|---|---|---|
| 6,753,692 B2 | 6/2004 | Toyomura et al. | |
| 2001/0040453 A1* | 11/2001 | Toyomura | H02S 50/10 324/332 |

(Continued)

FOREIGN PATENT DOCUMENTS

| | | |
|---|---|---|
| CN | 102565658 A | 7/2012 |
| CN | 102864439 A | 1/2013 |

(Continued)

OTHER PUBLICATIONS

Japanese Office Action from JP Application No. 2016-516263, dated Dec. 19, 2017.

(Continued)

*Primary Examiner* — Sadie White
(74) *Attorney, Agent, or Firm* — Workman Nydegger (57) ABSTRACT

The invention provides a method for detecting, regenerating and/or preventing defects in solar panels of a solar panel installation. In this method, a regeneration voltage is applied between the supporting structure in which the solar panels are mounted, and the negative pole of the solar panels, the positive pole of the solar panels, or both poles of the solar panels, being short-circuited. Additionally, the invention also provides an apparatus for performing said method, and a solar panel installation comprising said apparatus.

20 Claims, 2 Drawing Sheets

(56) References Cited

U.S. PATENT DOCUMENTS

| | | | | |
|---|---|---|---|---|
| 2010/0200040 | A1* | 8/2010 | Chen | H01L 31/186 |
| | | | | 136/244 |
| 2011/0227584 | A1* | 9/2011 | Beck | G01R 31/129 |
| | | | | 324/551 |
| 2014/0132302 | A1 | 5/2014 | Nagel | |
| 2015/0221787 | A1 | 8/2015 | Huang et al. | |

FOREIGN PATENT DOCUMENTS

| | | | |
|---|---|---|---|
| JP | 2001345472 | A | 12/2001 |
| JP | 2004047838 | A | 2/2004 |
| JP | 2005142180 | A | 6/2005 |
| WO | 2012122131 | A2 | 9/2012 |
| WO | 2012168249 | A2 | 12/2012 |
| WO | 2012168250 | A1 | 12/2012 |

OTHER PUBLICATIONS

Hacke et al., "System Voltage Potential-Induced Degradation Mechanisms in PV Modules and Methods for Test", 37th IEEE Photovoltaic Specialists Conference (PVSC 37), Jun. 19-24, 2011, pp. 1-9, Seattle, Washington, USA.

International Search Report for corresponding International PCT Application No. PCT/IB2014/058444, dated Jul. 28, 2014.

Nagel et al., "Crystalline Si Solar Cells and Modules Featuring Excellent Stability Against Potential Induced Degradation", 26th European Photovoltaic Solar Energy Conference and Exhibition, Sep. 9, 2011, pp. 3107-3112, Hamburg, Germany.

Pingel et al., "Potential Induced Degradation of Solar Cells and Panels", 35th IEEE Photovoltaic Specialists Conference (PVSC), Jun. 20-25, 2010, pp. 2817-2822, Honolulu, Hawaii USA.

\* cited by examiner

Fig. 1

METHOD AND APPARATUS FOR DETECTING, REGENERATING AND/OR PREVENTING DEFECTS IN A SOLAR PANEL INSTALLATION

TECHNICAL FIELD

The present invention relates to the field of solar energy, and more particularly to solar panel installations with solar panels comprising photovoltaic cells. The present invention is operable for reducing degradation of solar panels in solar panel installations, and thereby also for improving the efficiency of such solar panel installations and maintaining this efficiency over time.

BACKGROUND ART

Existing solar panel installations based on photovoltaic cells are susceptible to degradation over time. Because of the degradation the efficiency, thus the energy output, of these solar panel installations will diminish over time. Degradation of solar panels may have different causes such as physical damage, hot spots, snail trails, mismatch, delamination, back currents, potential induced degradation (PID), and other defects that are caused or deteriorated by potentials which accelerate the degradation of solar panels. Such defects are widespread, occurring in at least 75% of solar panel installations.

Physical damage may be due, among other things, to production errors during manufacturing of the solar panels, damage sustained during transport or incorrect installation of the solar panels, and external circumstances such as for example the weather while the solar panels are in use. Such defects may be significantly reduced by handling the solar panels with appropriate care, but can never be entirely prevented. Once present, such defects can also lead to further defects during the use of the solar panels.

Hot spots occur in solar panels of which some photovoltaic cells are located in the shade or are damaged. These photovoltaic cells present a higher resistance than the surrounding, illuminated and undamaged photovoltaic cells, which produce a higher current. This higher current also has to pass through the unilluminated and/or damaged cells with a higher resistance, causing them to heat up. As a consequence, these cells may sustain further damage, and cause damage to surrounding parts of the solar panel as well.

Mismatch is a similar problem to hot spots, in which solar panels have been manufactured with photovoltaic cells having different properties. As a consequence, certain photovoltaic cells may be under heavier load during use than others, and consequently sustain damage.

Hot spots and mismatches may be partly dealt with by placing a "bypass" diode in parallel with a number of photovoltaic cells. If the resistance of a particular set of photovoltaic cells then grows too high, the current from the other photovoltaic cells will pass through this bypass diode, such that no load is placed on the defect cells. However, this protective measure needs to be implemented during manufacture of the solar panels, and is not capable of remedying any causes of the defect.

Snail trails are dark discolorations observed on the surface of solar panels. These discolorations generally are a finger's width and similar in shape to a snail's mucus trail. This defect is most probably caused by chemical reactions occurring between the plastic material surrounding the photovoltaic cells and the conductive grid on the photovoltaic cells. This defect can be remedied by using different materials in which this phenomenon does not occur for the manufacture of solar panels. For existing solar panel installations, however, this is not a solution.

Delamination is the peeling off of the different protective layers applied to solar panels. This phenomenon is due, among other things, to external conditions such as for example humidity, fluctuations in temperature and sunlight. Improvements in the protective layers used may partly prevent this problem, but not entirely. The risk of delamination always remains, and once the defect appears it will increase and possibly cause further defects. Moreover, the use of improved protective layers is no solution for the solar panels of solar panel installations already in use.

Normally, an electrical current flows from the solar panels to the electricity grid or to a battery. The current may however flow in the other direction as well, from the electricity grid or a battery to the solar panels. These back currents can place the solar panels under load and cause damage. The solar panels can be protected against this by installing diodes that prevent currents flowing back, but these are effective only up to a certain breakdown voltage.

The potential induced degradation (PID) of solar panels is due to the electrons from the semiconductors of the photovoltaic cells flowing out to the surrounding structures, such as for example an overlying glass plate, an underlying support plate, the surrounding protective layers, and the frame or supporting structure in which the solar panel is mounted. This flowing out occurs due to the high voltages that build up between the photovoltaic cells and these structures. The flowing out of electrons influences the PN junction between the semiconductors in the photovoltaic cell, thereby reducing their function.

WO 2012/168249 A2 shows a method for detecting PID in photovoltaic cells or panels during the manufacturing process. It involves placing a conductive plastic plate against the front side or back side of a photovoltaic cell or panel and applying a DC voltage higher than 50V (up to, for example, 6500V) between both. An electrical characteristic (current-voltage characteristic or I-V characteristic, parallel resistance) of the photovoltaic cell or panel is then measured at different points in time to assess its quality and suitability. This test should preferably be performed under controlled conditions of temperature (preferably 85° C.) and atmospheric humidity (preferably 85%).

WO 2012/168250 A1 shows a similar method, divided into several steps to speed up the process. Well-functioning photovoltaic cells are quickly recognized in a first test phase, which can be performed quickly; only photovoltaic cells that perform badly are subjected to further tests and, optionally, regeneration, to carry out a further selection. The first test should preferably be performed under controlled conditions of temperature (>60° C., preferably 85° C.) and atmospheric humidity (>60%, preferably 85%). Further tests may be performed under different conditions to simulate day and night. Voltages of 0V up to −1000V are applied.

A disadvantage of these methods is that they require a special sensor to be applied over the front side or the back side of the photovoltaic cell or panel. A sensor that is suited for all types and sizes of solar panels is difficult to produce. Another disadvantage is that these methods need to be carried out under controlled conditions and are therefore not suitable for testing installed solar panels in an operating environment.

CN 102864439 A shows a method for preparing an antireflection film that is resistant against the PID effect. This antireflection film can protect the photovoltaic cells in a solar panel against PID, but offers no improvement of the problem once it has occurred. An additional disadvantage of the antireflection film is that it cannot be applied to existing solar panels.

CN 102 565 658 discloses a test method of PID (Potential-Induced Degradation) of a solar cell module. The test method comprises the following steps of: (1) testing and recording initial data of a tested solar cell module; (2) installing the tested solar cell module in a high-temperature and low-temperature experimental environment box and carrying out insulated treatment between the tested solar cell module and the high-temperature and low-temperature experimental environment box; (3) polarly connecting the anode and the cathode of the tested solar cell module, which are subjected to short-circuited connection, with the cathode of high-voltage loading equipment, and connecting a frame of the solar cell module with the anode of the high-voltage loading equipment; (4) starting the high-temperature and low-temperature experimental environment box, starting the high-voltage loading equipment and debugging the high-voltage loading equipment to the output voltage value of 600-1000V, and simultaneously starting a current monitor for carrying out electric leakage monitoring; (6) testing and recording final data of the tested solar cell module; (7) comparing the initial data with the final data of the tested solar cell module and evaluating power degradation; and (8) finishing the test.

In "Crystalline Si solar cells and modules featuring excellent stability against potential-induced degradation" by H. Nagel et al., from the "26$^{th}$ EUROPEAN INTERNATIONAL CONFERENCE ON PHOTOVOLTAIC SOLAR ENERGY 5-9 Sep. 2011, HAMBURG, GERMANY", 9 Sep. 2011, pages 3107-3112, an assessment of all kinds of solutions for potential-induced degradation (PID) of p-type crystalline silicon solar cells reveals that a great demand exists on i) PID-resistant solar cells and ii) on alternative encapsulation materials which protect PID-prone cells in the module. A further assessment of solutions for PID is disclosed describing that a positive voltage between modules and ground may be applied for regeneration at night.

In PINGEL S ET AL, "Potential Induced Degradation of solar cells and panels", 35TH IEEE PHOTOVOLTAIC SPECIALISTS CONFERENCE (PVSC), 20-25 Jun. 2010, HONOLULU, Hi., USA, IEEE, PISCATAWAY, N.J., USA, 20 Jun. 2010, pages 2817-2822, it is disclosed that solar energy generation is getting more and more important worldwide PV systems and solar parks are becoming larger consisting of an increasing number of solar panels being serially interconnected. As a consequence panels are frequently exposed to high relative potentials towards ground causing High Voltage Stress (HVS). The effect of HVS on long term stability of solar panels depending on the leakage current between solar cells and ground has been first addressed by NREL in 2005 [1]. This potential degradation mechanism is not monitored by the typical PV tests listed in IEC 61215 [2]. Depending on the technology different types of Potential Induced Degradation (PID) occur. This paper is focusing on PID of wafer based standard p-type silicon technology aiming on increasing life times for solar panels once exposed to external potentials in the field. A test setup is presented for simulation of the PID in the lab and the influence of cell properties on PID is demonstrated in order to reveal the cell being the precondition for the PID. The paper further discloses that by grounding of the positive pole of the PV system and thereby avoiding of harmful potentials leads to regeneration of affected solar panels. This recovery process takes time and the rate depends on the potential and environmental factors such as humidity and temperature.

Solutions already exist, then, that can detect of prevent the different defects in solar panels. However, some of these solutions require adjustments to the solar panels themselves and are therefore impossible or very hard to implement in existing solar panel installations. These solutions also require the manufacturing process of solar panels to be modified and will increase the production cost of these solar panels. Other solutions are very laborious to implement in existing solar panel installations and cannot be expanded to all types of solar panel installations in a straightforward manner. Moreover, most of these solutions are intended to either detect or prevent the defects.

It is an aim of the present invention to prevent or at least mitigate one or more of the problems described above, and/or to provide improvements in general.

DISCLOSURE OF THE INVENTION

According to the invention, a method and an apparatus are provided for regenerating defects in solar panels of a solar panel installation.

This aim is achieved by means of the method according to claim 20.

The inventors have found that using this method, defects in solar panels caused or deteriorated by the potentials on the solar panel can be regenerated. Some defects can be fully regenerated. This was shown by the inventors in a laboratory setting using electroluminescence, a phenomenon wherein a material emits light as a result of an electrical current passing through it or an electrical voltage applied to it. This phenomenon occurs in well-functioning photovoltaic cells as well. If the photovoltaic cells are damaged, however, they will emit less or no light in an electroluminescence test. A comparison of electroluminescence tests of solar panels exhibiting defects, performed before and after applying the method according to the present invention, shows that a number of defect photovoltaic cells always emit no or less light before the method is applied, whereas they again emit their full light after application of the method. The method was also tested by the inventors in existing solar panel installations already in use. Here, a marked efficiency increase in energy output of the solar panel installations was shown after applying the method according to the present invention.

During these test, the inventors also found that the method according to the present invention can offer a permanent solution for regenerating defects in the solar panels of solar panel installations, and thus for reducing the degeneration of solar panels.

Furthermore, the inventors have found that the method according to the present invention is applicable to various types of solar panels, comprising photovoltaic cells of various brands and types.

Another advantage of the method according to the present invention is that it can be performed at night. As a result, the operation of the solar panels during the day does not need to be interrupted, so that no loss of output occurs.

In the method according to the present invention, an electrical connection is made in step (b) between a first pole of at least one voltage supply and at least one of the poles of the at least one solar panel. An electrical connection can in other words be made with the negative pole, the positive pole, or both poles. In the latter case, the at least one solar panel is short-circuited. Here, the at least one solar panel is preferably first short-circuited by electrically connecting the positive pole with the negative pole, before establishing the connection with the first pole of the at least one voltage supply.

In some solar panel installations, the supporting structure is grounded. Hence, by electrically connecting a first pole of the at least one voltage supply with the supporting structure, both are brought to one and the same reference potential, equal to the ground potential.

In another embodiment, the present invention provides the apparatus according to claim 32.

The inventors have found it to be advantageous to provide an apparatus allowing the method according to the present invention to be performed without intervention or with minimal intervention of a person, such as for example a technician. Using such an apparatus the method according to the present invention can very easily be applied to a solar panel installation, particularly one comprising a large number of solar panels.

The circuits for establishing and disconnecting electrical connections may be produced in any way known to the person skilled in the art. These circuits may for example provide connectors to which elements external to the apparatus can be electrically connected, the electrical connections from these connectors to the at least one voltage supply; and switching elements to enable these electrical connections to be interrupted. Depending on the circuit, the elements external to the apparatus can be the at least one supporting structure or the at least one solar panel. The switching elements may be provided in any way known to the person skilled in the art, such as for example using transistors, thyristors, triacs, relays etc.

Moreover, it is not necessary for all the parts of the apparatus according to the present invention to be placed together. They can also be spread over different positions in the solar panel installation. For example, in a solar panel installation comprising a large number of solar panels, the solar panels are commonly divided into groups of solar panels. Here, it may be advantageous to provide the different parts of the apparatus according to the present invention per group of solar panels.

BRIEF DESCRIPTION OF THE DRAWINGS

The invention will be further elucidated by means of the following description and the appended figures.

MODES FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "an apparatus comprising means A and B" should not be limited to apparatuses consisting only of components A and B. It means that with respect to the present invention, the only relevant components of the apparatus are A and B.

In an embodiment of the method according to the present invention, step (c) further comprises measuring the power drawn from the at least one voltage supply by the at least one solar panel.

From the power measured, data can be obtained about the health of the at least one solar panel, i.e. the type, the number and the gravity of the defects the at least one solar panel exhibits. In general, the more power is drawn from the at least one voltage supply by the at least one solar panel, the higher the number and gravity of the defects the at least one solar panel exhibits. Information regarding the nature of the defects can also be gleaned from the evolution of the power over time. If the measured power is higher than the normal power to be expected, and if the measured power remains stable over time, the elevation is due to non-regenerable defects such as for example physical damage or delamination. In this case, applying the regeneration voltage can still prevent additional defects and deterioration. If, however, the measured power decreases, the elevation was due to regenerable defects such as for example hot spots, snail trails, or mismatches.

In a further embodiment, the method further comprises, between step (c) and step (d), a step (c') of adjusting the regeneration voltage and/or regeneration duration on the basis of the power measured in step (c).

If the measured power is high compared to the power that would be drawn from the at least one voltage supply by a similar solar panel not exhibiting any defects, then it is advantageous to adjust the regeneration voltage and/or regeneration duration to speed up the regeneration of the at least one solar panel.

The inventors have found that increasing the regeneration voltage and/or extending the regeneration duration ensures a faster regeneration of the at least one solar panel.

The regeneration voltage is preferably applied for a regeneration duration equaling one night. This allows the whole night to be used for the regeneration of the solar panel. If, however, the regeneration of the defects progresses favorably, the regeneration duration may be shortened. If the defects regenerate completely, for example, a much shorter regeneration duration of for example 10 minutes may be chosen for maintenance of the solar panel and to prevent new defects from occurring.

In a further embodiment, step (c') further comprises measuring the power drawn from the at least one voltage supply by the at least one solar panel.

If the regeneration voltage and/or the regeneration duration is adjusted on the basis of the measured power, it can be advantageous to measure again the power drawn by the at least one solar panel from the at least one voltage supply. In this way, additional data may be obtained on the health of the at least one solar panel. Combined with the data obtained from the power measured previously, it will allow to assess how well and how quickly the regeneration of the defects in the at least one solar panel progresses.

In an embodiment of the method according to the present invention, the regeneration voltage is an AC voltage.

This AC voltage may be any periodic signal, such as for example a sine, a rectified sine, a full-wave rectified sine, a square wave, a triangular wave, a saw tooth wave, a trapezoid wave, etc. The AC voltage preferably has an effective voltage between 200 V and 1200 V, wherein the effective voltage is calculated as the root mean square of the signal. The AC voltage preferably has a frequency between 50 Hz and 50 kHz, i.e. a period between 20 ms and 20 μs.

In an embodiment of the method according to the present invention, the regeneration voltage is a DC voltage.

The magnitude of the DC voltage preferably has an absolute value between 200 V and 1200 V. The DC voltage may also be a slow-varying, non-periodic signal, wherein the magnitude of this signal is also preferably between these voltage values.

The solar panel installation in the method according to the present invention further comprises an electrical connection between the at least one solar panel and an electricity grid, the method further comprises, between step (a) and step (b), a step (a') of undoing the electrical connection between the at least one solar panel and the electricity grid, and step (d) further comprises electrically re-connecting the at least one solar panel with the electricity grid.

Normally, a solar panel installation is electrically connected to an electricity grid to which it supplies a voltage. This electricity grid may for example be the public electricity grid between energy suppliers and end users, but it can also simply be a battery which is charged by means of the solar panel installation. According to the invention, the method further comprises, for safety reasons, disconnecting the solar panel installation from the electricity grid in step (a').

In a further embodiment, step (a') further comprises verifying if the electrical connection between the at least one solar panel and the electricity grid has effectively been undone.

A solar panel installation typically delivers large voltages to the electricity grid. These voltages may be larger than the breakdown voltage of the interrupt in the electrical connection between the at least one solar panel and the electricity grid. It can therefore be advantageous, after disconnecting the electrical connection between the at least one solar panel and the electricity grid, to verify if this electrical connection has effectively been interrupted or disconnected.

According to the invention, the solar panel installation in the method comprises at least one converter, said at least one converter being located between the at least one solar panel and the electricity grid and electrically connected to both, and said at least one converter converting the DC voltage of the at least one solar panel to an AC voltage suitable for supplying to the electricity grid, in step (b) in the method, the electrical connection between the at least one solar panel and the electricity grid is interrupted before the converter.

It is advantageous to disconnect the converter as well, such that it cannot affect the performing of the further method according to the present invention for regenerating defects in the at least one solar panel. This has the further advantage that the method can be applied regardless of the brand and type of the converter used.

In an embodiment of the method according to the present invention, the method is performed at night.

It is highly advantageous to perform the method according to an embodiment of the present invention at night. During the night, very little to no light hits the at least one solar panel of the solar panel installation, such that it delivers very little to no energy. Performing the method at night obviates the need to interrupt the energy production of the solar panel installation during the day.

In an embodiment of the method according to the present invention, the method is repeated at regular times.

It can be advantageous to repeat the method according to an embodiment of the present invention at regular times, for example every night. This way, defects in the at least one solar panel of the solar panel installation are detected, regenerated or prevented on a regular basis. The method can thus provide a permanent solution for reducing the degeneration of the at least one solar panel of the solar panel installation.

In an embodiment of the apparatus according to the present invention, the apparatus further comprises at least one power meter to determine the power drawn by the at least one solar panel from the at least one voltage supply, and the power meter is electrically connected to and located between the at least one solar panel and the at least one voltage supply.

The at least one power meter can be used for collecting data about the health of the at least one solar panel, i.e. the type, number, and gravity of the defects exhibited by the at least one solar panel.

According to the invention, the apparatus further comprises an electrical connection between the at least one solar panel and an electricity grid, and the apparatus further comprises a circuit for establishing and disconnecting an electrical connection between the poles of the at least one solar panel on the one hand, and the electricity grid on the other hand.

According to the invention, to protect the apparatus against the influences of the electricity grid or of any converters located between the at least one solar panel and the electricity grid, the apparatus can be disconnected from the electricity grid.

In a further embodiment, the apparatus further comprises at least one control unit for controlling the apparatus, and the control unit is in communication with the at least one voltage supply and the circuits for establishing and disconnecting the electrical connections.

It is advantageous to provide the apparatus according to an embodiment of the present invention with a control unit with which the different parts of the apparatus can be controlled. This allows the method according to an embodiment of the present invention to be performed by the control unit without human intervention.

It is also possible to arrange the apparatus according to an embodiment of the present invention without a control unit in such a way that no human control or control by a control unit is required. The use of the at least one control unit, however, offers the advantage that the control can easily modified by reprogramming the control unit, if the latter is provided thereto.

In a solar panel installation with a large number of grouped solar panels, it may be advantageous to provide the at least one voltage supply, the required circuit and optionally a power meter per group of solar panels, and to arrange them to be controlled from one central control unit. This allows the cost of the apparatus according to an embodiment of the present invention to be reduced.

In a further embodiment, the at least one control unit is also in communication with the at least one power meter.

If the apparatus according to an embodiment of the present invention comprises at least one power meter for measuring the power drawn by the at least one solar panel from the at least one voltage supply, it is advantageous for the at least one power meter to also be in communication with the at least one control unit. This allows the at least one control unit to collect data on the measured power, on the basis of which the at least one control unit can the further control the at least one voltage supply in a modified manner.

In another embodiment, the present invention provides a solar panel installation which comprises the apparatus according to an embodiment of the present invention.

It is advantageous to provide the apparatus according to an embodiment of the present invention in a solar panel installation. This allows the detection, regeneration and/or prevention of defects in the at least one solar panel of the solar panel installation to be performed, using the method according to an embodiment of the present invention, in such a way that little or no human intervention is required. This also allows the method according to an embodiment of the present invention to be performed at night and at regular times, eliminating the need for person, for example an operator, to be present.

Figure 1:
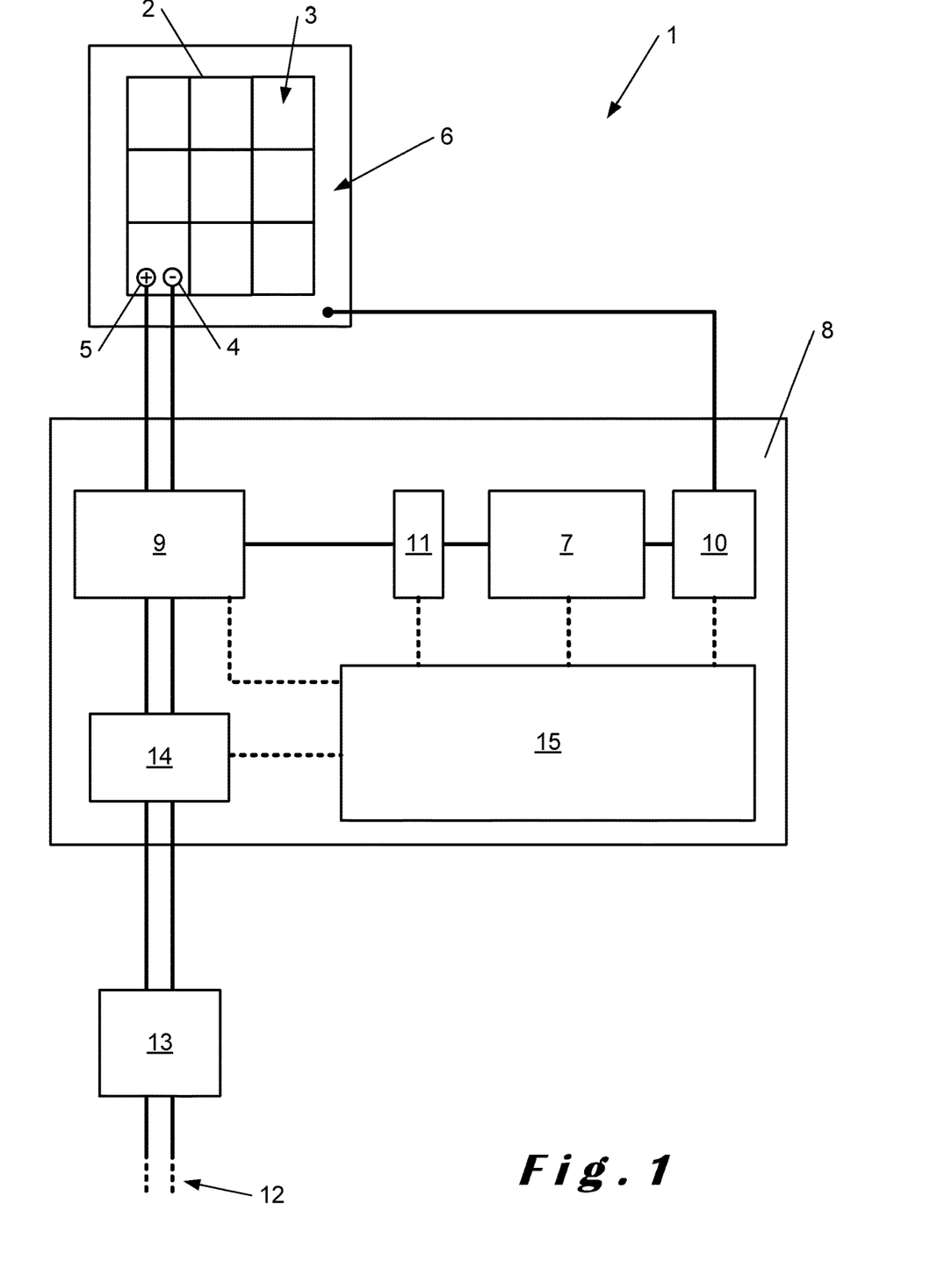
FIG. 1 shows a schematic representation of a solar panel installation comprising an apparatus according to an embodiment of the present invention.

FIG. 1 shows a schematic representation of a solar panel installation 1 comprising an apparatus 8 according to an embodiment of the present invention for detecting, regenerating and/or preventing defects in solar panels 2 of a solar panel installation 1. For the sake of simplicity, only one solar panel 2 is shown in this embodiment example. This solar panel comprises nine photovoltaic cells 3, is provided with connectors for the negative pole 4 and the positive pole 5 of the solar panel 2, and is mounted in a supporting structure 6. The solar panel 2 is electrically connected with a converter 13, which is further electrically connected with the electricity grid 12. The apparatus 8 according to the present invention is located on the electrical connection between the solar panel 2 and the converter 13. The apparatus comprises: a voltage supply 7, a power meter 11, a control unit 15, a circuit 9 for establishing and disconnecting the electrical connection between the solar panel 2 and the voltage supply 7, a circuit 14 for establishing and disconnecting the electrical connection between the solar panel 2 and the converter 13 and, further, the electricity grid 12, and a circuit 10 for establishing and disconnecting the electrical connection between the supporting structure 6 and the voltage supply 7. One pole of the voltage supply 7 is electrically connected with the circuit 9 for establishing and disconnecting the electrical connection between the solar panel 2 and the voltage supply 7. Also provided on this electrical connection is the power meter 11 for measuring the power drawn by the solar panel 2 from the voltage supply 7. The circuit 9 for establishing and disconnecting the electrical connection between the solar panel 2 and the voltage supply 7 is further electrically connected with both the negative pole 4 and the positive pole 5 of the solar panel 2. This circuit 9 may be arranged in such a way that the voltage supply 7 can be electrically connected with the negative pole 4 of the solar panel 2, the positive pole 5 of the solar panel 2, and the negative pole 4 and positive pole 5 of the solar panel 2 short-circuited to each other. Another pole of the voltage supply 7 is electrically connected with the supporting structure 6 on which the solar panel 2 is mounted. Also provided on this electrical connection is the circuit 10 for establishing and disconnecting the electrical connection between the supporting structure 6 and the voltage supply 7. The circuit 14 for establishing and disconnecting the electrical connection between the solar panel 2 and the converter 13 and, further, the electricity grid 12 is located on the electrical connection between the converter 13 and the circuit 9 for establishing and disconnecting the electrical connection between the solar panel 2 and the voltage supply 7. In this embodiment example, the control unit 15 is in communication with every other part of the apparatus 8, and is arranged thereto for controlling these parts by means of the method according to an embodiment of the present invention.

The apparatus of FIG. 1 operates as follows. Initially, the circuit 10 for establishing and disconnecting the electrical connection between the voltage supply 7 and the supporting structure 6 and the circuit 9 for establishing and disconnecting the electrical connection between the voltage supply 7 and the solar panel 2, are switched in such a way that there is no electrical connection between the voltage supply 7 and the supporting structure 6, nor between the voltage supply 7 and the solar panel 2, and the circuit 14 for establishing and disconnecting the electrical connection between the solar panel 2 and the converter 13 and, further, the electricity grid 12 is switched in such a way that there is an electrical connection between the solar panel 2 and the converter 13 and, further, the electricity grid 12. In a first step, the circuit 10 for establishing and disconnecting the electrical connection between the voltage supply 7 and the supporting structure 6 is controlled by the control unit 15 to establish the electrical connection between a first pole of the voltage supply 7 and the supporting structure 6. Then, the circuit 14 for establishing and disconnecting the electrical connection between the solar panel 2 and the converter 13 and, further, the electricity grid 12 is controlled by the control unit 15 to disconnect the electrical connection between the solar panel 2 and the converter 13 and, further, the electricity grid 12. Next, checking if a current still flows between the solar panel 2 and the converter 13 and, further, the electricity grid 12, is carried out to verify whether the electrical connection between the solar panel 2 and the converter 13 has truly been undone, i.e., disconnected. This verification can take place in the circuit 14 for establishing and disconnecting the electrical connection between the solar panel 2 and the converter 13 and, further, the electricity grid 12, and can be controlled by the control unit 15. Data on whether or not the electrical connection between the solar panel 2 and the converter 13 and, further, the electricity grid 12 has been disconnected can then be sent back to the control unit 15. In case the electrical connection between the solar panel 2 and the converter 13 and, further, the electricity grid 12 has not been disconnected, the control unit 15 can then take further steps yet to disconnect it. If the electrical connection between the solar panel 2 and the converter 13 and, further, the electricity grid 12 has been disconnected, the control unit 15 will further control the circuit 9 for establishing and disconnecting the electrical connection between the voltage supply 7 and the solar panel 2 to establish an electrical connection between a second pole of the voltage supply 7 and either the negative pole 4 of the solar panel 2, the positive pole 5 of the solar panel 2, or the short-circuited poles 4,5 of the solar panel 2. Next, the control unit 15 will control the voltage supply 7 to apply a predetermined regeneration voltage between the solar panel 2 and the supporting structure 6, and to maintain this regeneration voltage for a predetermined regeneration duration. During the course of the regeneration duration, the control unit 15 will then control the power meter 11 to measure the power drawn by the solar panel 2 from the voltage supply 7. The measured power is then sent to the control unit 15, which can, on the basis of these data, control the voltage supply 7 to apply an adjusted regeneration voltage between the solar panel 2 and the supporting structure 6, and/or can control the voltage supply 7 to maintain the regeneration voltage for an adjusted regeneration duration. Next, the control unit 15 can, during the course of the regeneration duration, once more control the power meter 11 to measure the power drawn by the solar panel 2 from the voltage supply 7. The measured power can then be sent back to the control unit 15, which from it can obtain data on the health of the solar panel 2 and report on them. Optionally, the steps of measuring the power and adjusting the regeneration voltage and/or the regeneration duration can be repeated iteratively to further optimize the applied regeneration voltage and/or regeneration duration. In a final step, the control unit 15 then further controls the different circuits 9,10,14 for establishing and disconnecting electrical connections to switch them back to their initial states. This entire method is preferably repeated at regular times to prevent the degeneration of the solar panel 2 in a timely manner and to repair it on a regular basis. Furthermore, the method is preferably performed at night so as not to interrupt the energy production of the solar panel 2 during the day.

Figure 2:
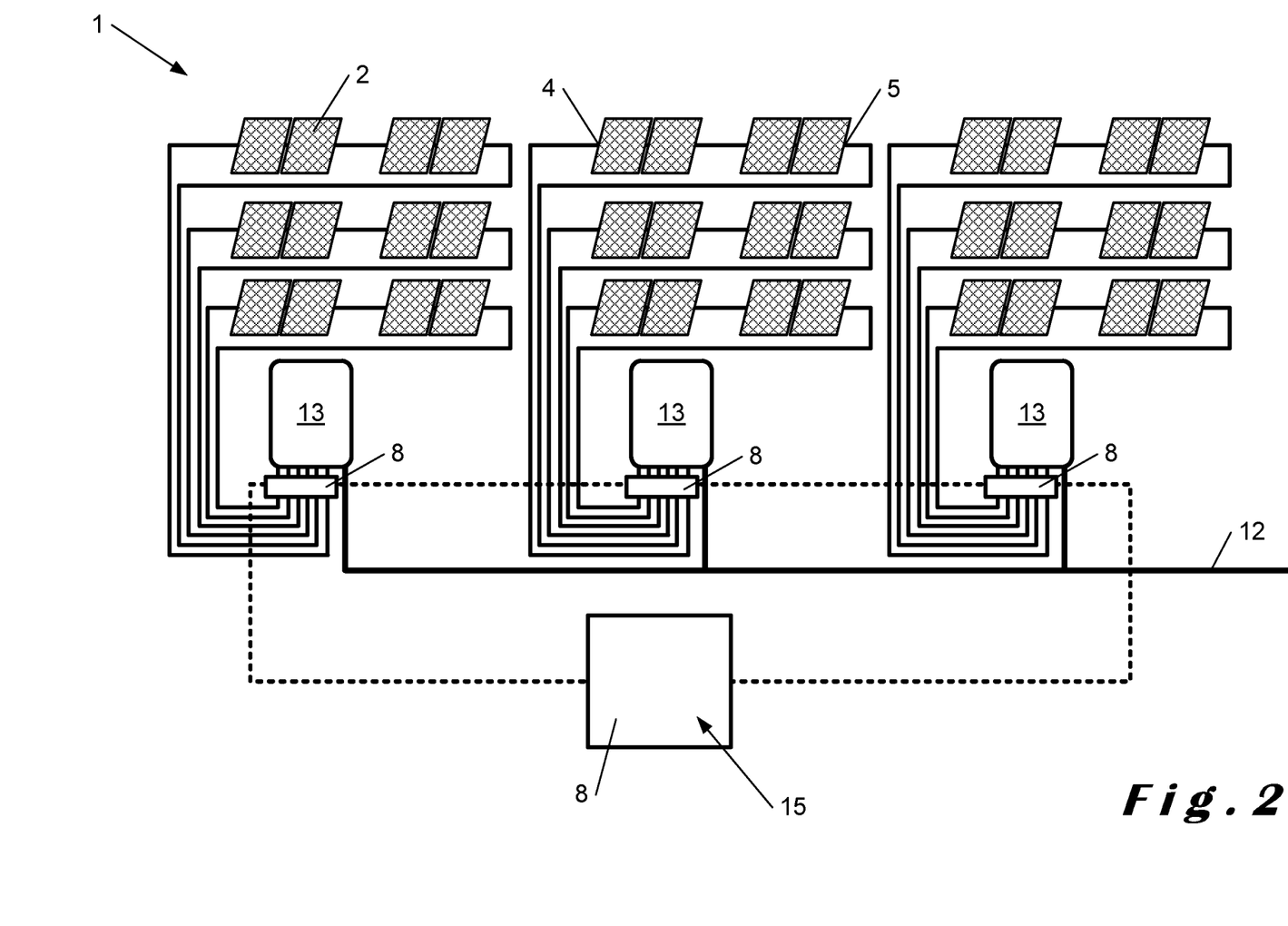
FIG. 2 shows a schematic representation of a more extensive solar panel installation comprising an apparatus according to an embodiment of the present invention.

FIG. 2 shows a schematic representation of a more extensive solar panel installation 1 comprising an apparatus 8 according to an embodiment of the present invention for detecting, regenerating and/or preventing defects in solar panels 2 of a solar panel installation 1. In this embodiment example, the solar panel installation 1 comprises, in total, thirty-six solar panels 2. These solar panels 2 are arranged into groups of four, and thus interconnected in series. Each group of four solar panels 2 is electrically connected, at both its negative pole 4 and its positive pole 5, with one of the three converters 13 of the solar panel installation 1. The converters 13 are further electrically connected with the electricity grid 12. For the sake of simplicity, the supporting structures 6 of the solar panels 2 are not shown, but the solar panels 2 in this embodiment example are mounted by pairs in one and the same supporting structure 6. Between the solar panels 2 and each converter 13, there is provided everywhere a part of an apparatus 8 according to an embodiment of the present invention. In this embodiment example, the parts of the apparatus 8 shown between the solar panels 2 and the converters 13 comprise all components as shown in the apparatus of FIG. 1, except for the control unit 15. As the supporting structures 6 are not shown in the figure, neither are the electrical connections between the apparatus 8 and the supporting structures 6. One control unit 15 is provided centrally for controlling the parts of the apparatus which are provided between the solar panels 2 and the converters 13.

The apparatus 8 of FIG. 2 works in a similar manner as that of FIG. 1, with the distinction that the apparatus 8 is now divided into different parts that are controlled by one central control unit 15. Herein, every part of the apparatus 8 is tasked with detecting, regenerating and/or preventing defects in part of the solar panels 2 belonging to a solar panel installation 1 with a greater number of solar panels 2.

LIST OF REFERENCE NUMBERS 1 solar panel installation
2 solar panel
3 photovoltaic cell
4 negative pole of the solar panel
5 positive pole of the solar panel
6 supporting structure
7 voltage supply
8 apparatus
9 circuit between voltage supply and solar panel
10 circuit between voltage supply and supporting structure
11 power meter
12 electricity grid
13 converter
14 circuit between solar panel and electricity grid
15 control unit

The invention claimed is:

1. An apparatus that regenerates defects in solar panels of a solar panel installation, which solar panel installation comprises:
   at least one solar panel comprising at least one photovoltaic cell or a plurality of electrically connected photovoltaic cells, wherein the at least one solar panel has a negative pole and a positive pole,
   at least one supporting structure in which the at least one solar panel is mounted, wherein the apparatus comprises the following:
   at least one voltage supply that applies a regeneration voltage between the at least one solar panel and the at least one supporting structure, the regeneration voltage being sufficient to regenerate said defects in the solar panels of the solar panel installation,
   a first circuit that establishes and disconnects an electrical connection between a first pole of the at least one voltage supply and the at least one supporting structure, and
   a second circuit that establishes and disconnects an electrical connection between a second pole of the at least one voltage supply and at least one of the poles of the at least one solar panel, and
   wherein the solar panel installation further comprises an electrical connection between the at least one solar panel and an electricity grid, and wherein the apparatus further comprises a third circuit that establishes and disconnects the electrical connection between the at least one solar panel and the electricity grid; and
   wherein the solar panel installation comprises at least one converter, said at least one converter being located between the at least one solar panel and the electricity grid and electrically connected to both, and wherein said at least one converter converts a DC voltage of the at least one solar panel to an AC voltage to be supplied to the electricity grid, and
   wherein the third circuit interrupts the electrical connection between both the negative pole and the positive pole of the at least one solar panel and the converter when the regeneration voltage is applied between the at least one solar panel and the at least one supporting structure.

2. The apparatus according to claim 1, said apparatus further comprising at least one power meter to determine the power drawn by the at least one solar panel from the at least one voltage supply, said power meter being electrically connected to and located between the at least one solar panel and the at least one voltage supply.

3. The apparatus according to claim 1, said apparatus further comprising at least one controller that controls the apparatus, said controller being in communication with the at least one voltage supply and the first circuit, the second circuit, and the third circuit.

4. The apparatus according to claim 1, wherein the apparatus detects defects in solar panels of a solar panel installation.

5. A solar panel system comprising:
a solar panel installation that includes at least one solar panel; and
an apparatus that regenerates defects in the at least one solar panel of the solar panel installation,
wherein the solar panel installation includes
the at least one solar panel that includes at least one photovoltaic cell or a plurality of electrically connected photovoltaic cells, wherein the at least one solar panel has a negative pole and a positive pole, and
at least one supporting structure in which the at least one solar panel is mounted,
wherein the apparatus includes
at least one voltage supply that applies a regeneration voltage between the at least one solar panel and the at least one supporting structure, the regeneration voltage being sufficient to regenerate said defects in the solar panels of the solar panel installation,
a first circuit that establishes and disconnects an electrical connection between a first pole of the at least one voltage supply and the at least one supporting structure, and
a second circuit that establishes and disconnects an electrical connection between a second pole of the at least one voltage supply and at least one of the poles of the at least one solar panel, and
wherein the solar panel installation further includes an electrical connection between the at least one solar panel and an electricity grid, and
wherein the apparatus further includes a third circuit that establishes and disconnects the electrical connection between the at least one solar panel and the electricity grid; and
wherein the solar panel installation further includes at least one converter, said at least one converter being located between the at least one solar panel and the electricity grid and electrically connected to both, and wherein said at least one converter converts a DC voltage of the at least one solar panel to an AC voltage to be supplied to the electricity grid, and
wherein the third circuit interrupts the electrical connection between both the negative pole and the positive pole of the at least one solar panel and the converter when the regeneration voltage is applied between the at least one solar panel and the at least one supporting structure.

6. The apparatus according to claim 2, wherein the at least one power meter is in communication with at least one controller, wherein said at least one controller adjusts the regeneration voltage applied by the at least one voltage supply on the basis of the power draw determined by the at least one power meter.

7. The apparatus according to claim 2, wherein the at least one power meter is in communication with at least one controller, wherein said at least one controller continuously adjusts the regeneration voltage applied by the at least one voltage supply on the basis of the power draw determined by the at least one power meter.

8. The apparatus according to claim 1, wherein the regeneration voltage is an AC voltage.

9. The apparatus according to claim 1, wherein the regeneration voltage is a DC voltage.

10. The apparatus according to claim 3, wherein the controller verifies that the electrical connection between the at least one solar panel and the electricity grid is disconnected prior to the at least one voltage supply applying the regeneration voltage.

11. The apparatus according to claim 3, wherein the controller actuates the apparatus based on whether it is day or night.

12. The apparatus according to claim 3, wherein the controller actuates the apparatus based on predetermined times.

13. The apparatus according to claim 8, wherein the AC voltage has an absolute value between 200 V and 1200 V and a frequency between 50 Hz and 50 KHz.

14. The apparatus according to claim 9, wherein the DC voltage has an absolute value between 200 V and 1200 V.

15. The apparatus according to claim 1, further comprising a controller that cyclically controls a regeneration of defects in the solar panels of the solar panel installation at periodic times by controlling application of the regeneration voltage by the at least one voltage supply and the first circuit, the second circuit, and third circuit.

16. The apparatus according to claim 15, further comprising at least one controller that collects data from the solar panel installation, and based on the collected data, the controller detects the defects in the solar panels.

17. The apparatus according to claim 15, wherein said controller modifies the application of the regeneration voltage and the first circuit, the second circuit, and third circuit based on said collected data.

18. The apparatus according to claim 15, wherein said controller receives power data of power drawn by the at least one solar panel from the at least one voltage supply, and said controller modifies the application of the regeneration voltage and the first circuit, the second circuit, and third circuit based on said power data.

19. The apparatus according to claim 2, wherein the at least one power meter is in communication with at least one controller, wherein said at least one controller adjusts a regeneration duration during which the regeneration voltage is applied by the at least one voltage supply on the basis of the power draw determined by the at least one power meter.

20. The apparatus according to claim 2, wherein the at least one power meter is in communication with at least one controller, wherein said at least one controller continuously adjusts a regeneration duration during which the regeneration voltage is applied by the at least one voltage supply on the basis of the power draw determined by the at least one power meter.

* * * * *